(12) United States Patent
Strobel

(10) Patent No.: US 12,155,459 B2
(45) Date of Patent: Nov. 26, 2024

(54) OPTICAL NETWORK UNIT ACTIVATION AND LOW LATENCY TRANSMISSIONS IN DELAY SENSITIVE NETWORKS

(71) Applicant: MaxLinear, Inc., Carlsbad, CA (US)

(72) Inventor: Rainer Strobel, Munich (DE)

(73) Assignee: MaxLinear, Inc., Carlsbad, CA (US)

( * ) Notice: Subject to any disclaimer, the term of this patent is extended or adjusted under 35 U.S.C. 154(b) by 177 days.

(21) Appl. No.: 17/649,334

(22) Filed: Jan. 28, 2022

(65) Prior Publication Data

US 2022/0247509 A1 Aug. 4, 2022

Related U.S. Application Data

(60) Provisional application No. 63/144,435, filed on Feb. 1, 2021.

(51) Int. Cl.
*H04J 14/02* (2006.01)

(52) U.S. Cl.
CPC ............................... *H04J 14/0249* (2013.01)

(58) Field of Classification Search
CPC .. H04J 14/0249; H04J 14/025; H04J 14/0252; H04J 2014/0253; H04J 14/0245; H04J 14/0242; H04J 14/0246
USPC .......................................................... 398/43
See application file for complete search history.

(56) References Cited

U.S. PATENT DOCUMENTS

| 2019/0174212 A1* | 6/2019 | Detwiler | ............ H04Q 11/0066 |
| 2020/0296487 A1* | 9/2020 | Bonk | ................... H04J 14/0221 |
| 2021/0297182 A1* | 9/2021 | Strobel | ............. H03M 13/3707 |

FOREIGN PATENT DOCUMENTS

| EP | 2926569 A1 * | 10/2015 | .......... H04J 11/0023 |
| WO | WO-2011122700 A1 * | 10/2011 | .......... H04J 14/0227 |

* cited by examiner

*Primary Examiner* — Mohammad R Sedighian
(74) *Attorney, Agent, or Firm* — Buchalter; Jason W. Croft

(57) ABSTRACT

According to an aspect of an embodiment, a method may include assigning an activation window by an optical line terminal during a portion of an upstream transmitting window in a passive optical network (PON). The method may include performing a first modification to a first upstream transmission. The method may include performing a second modification to a second upstream transmission. The method may include receiving the first upstream transmission from a first optical network unit (ONU) during the activation window, the first ONU synchronized in the PON. The method may include receiving a second upstream transmission from a second ONU during the activation window, the second ONU requesting activation in the PON.

12 Claims, 12 Drawing Sheets

OPTICAL NETWORK UNIT ACTIVATION AND LOW LATENCY TRANSMISSIONS IN DELAY SENSITIVE NETWORKS

The embodiments discussed in the present disclosure are related to optical network unit activation and low latency transmissions in delay sensitive networks.

BACKGROUND

Unless otherwise indicated herein, the materials described herein are not prior art to the claims in the present application and are not admitted to be prior art by inclusion in this section.

Passive optical networks (PONs) may include an optical line terminal (OLT) that may be connected to one or more optical network units (ONUs). Transmissions from the OLT to the one or more ONUs may include a continuous broadcast that may be received by all ONUs included in the PON. Transmissions from the one or more ONUs to the OLT may be organized in bursts, where each individual ONU may be allocated a transmission window.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an embodiment, a method includes assigning an activation window by an optical line terminal during a portion of an upstream transmitting window in a passive optical network (PON). The method also includes performing a first modification to a first upstream transmission. The method further includes performing a second modification to a second upstream transmission. The method also includes receiving the first upstream transmission from a first optical network unit (ONU) during the activation window, the first ONU synchronized in the PON. The method further includes receiving a second upstream transmission from a second ONU during the activation window, the second ONU requesting activation in the PON.

In another embodiment, a system includes an optical line terminal, a first optical network unit, and a second optical network unit. The optical line terminal includes a receiving circuit. The first optical network unit is synchronized in a passive optical network. The first optical network unit is configured to transmit a first multiplexed message to the optical line terminal. The first multiplexed message includes a first upstream transmission multiplexed with a first spreading code. The second optical network unit is not synchronized in the passive optical network. The second optical network unit is configured to transmit a second multiplexed message to the optical line terminal. The second multiplexed message includes a second upstream transmission multiplexed with a second spreading code. The receiving circuit is configured to demultiplex the first upstream transmission and to demultiplex the second upstream transmission.

In another embodiment, an optical line terminal includes a transmitting element and a receiving element. The transmitting element is configured to transmit a downstream message to one or more optical network units. The downstream message including a transmission profile for the one or more optical network units. The receiving element is configured to receive one or more upstream messages from the one or more optical network units. The receiving element distinguishes a first message of the one or more messages from a first optical network unit of the one or more optical network units from a second message of the one or more messages from a second optical network unit of the one or more optical network units.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
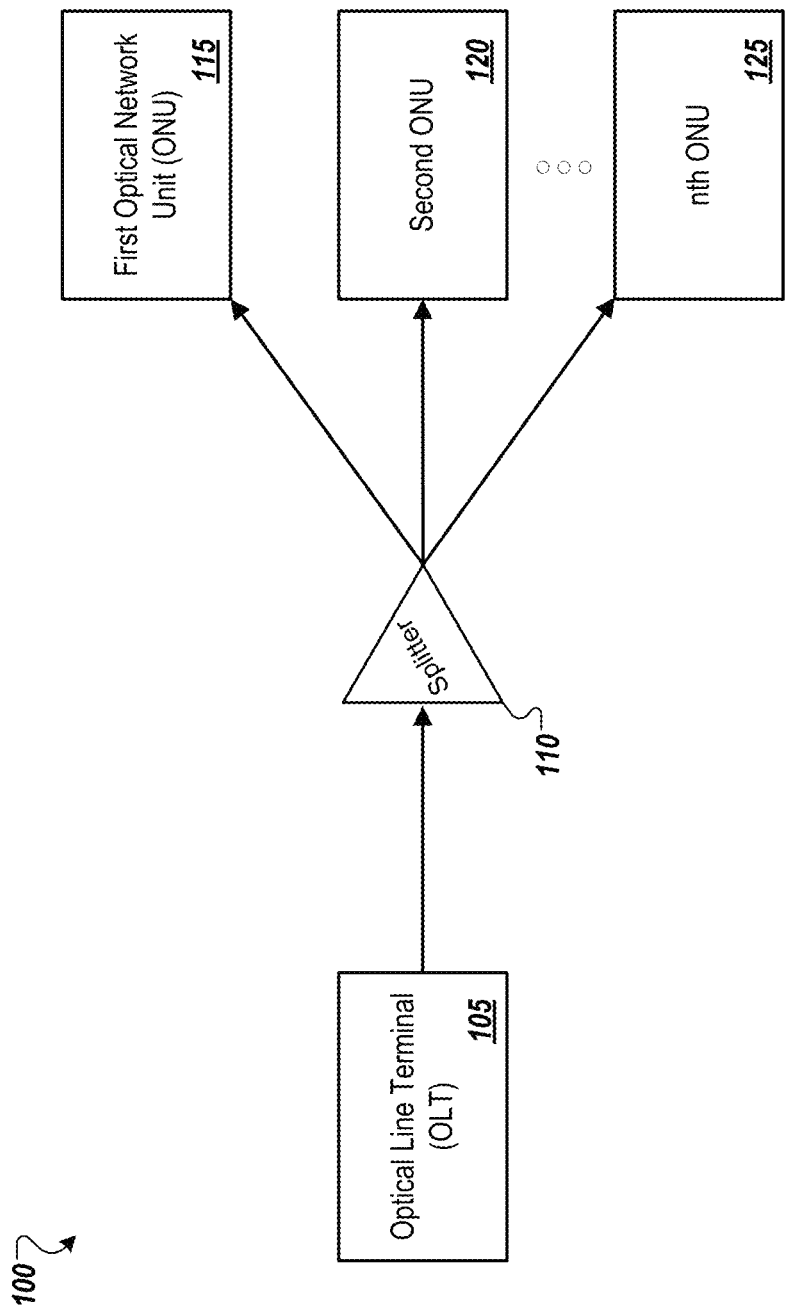
FIG. 1 illustrates a block diagram of an example passive optical network configured to perform optical network unit activation and low latency transmissions in delay sensitive networks.

In some prior systems, attempting to activate an optical network unit (ONU) with an optical line terminal (OLT) in a passive optical network (PON) may include scheduling one or more quiet windows for the activating ONU to transmit. During the quiet window, upstream transmissions may be limited to transmissions from activating ONUs and may not include transmissions from synchronized ONUs. In some circumstances, some synchronized ONUs may include delay sensitive transmissions which may be disrupted with the scheduled quiet windows.

In some prior systems, a second channel may be introduced that may be primarily reserved for activating ONU transmissions. The activating channel may include a separate wavelength to separate activating upstream transmissions from synchronized upstream transmissions. In some circumstances, the second channel may reduce and/or eliminate the quiet windows in the PON. Additionally, the second channel may increase costs, device size, footprint, etc., as a second transmitter may be used for the second channel.

In some prior systems, resource allocation in the PON may be optimized, such as by the OLT, to determine instances in which low latency synchronized upstream transmissions are present. In instances in which there are few, or none, low latency synchronized upstream transmissions, a quiet window may be scheduled for an activating ONU to transmit an upstream transmission. In some circumstances, the amount of time between quiet windows may be short or long, which may limit the activation of an activating ONU that is waiting for a quiet window.

In some prior systems, small gaps may be scheduled in synchronized upstream transmissions and an activating ONU may be configured to transmit at a reduced power such that the activating upstream transmission may not disturb a synchronized upstream transmission. In some circumstances, the transmit power of the ONU may be reduced below a threshold level such that the OLT receiver may not receive the activating upstream transmission.

Aspects of the present disclosure address these and other shortcomings of prior approaches by providing a PON that may be configured to multiplex spreading code with upstream transmissions. The spreading code may reduce an upstream data rate during an activation window, and the spreading code may be configured to allow an OLT receiver to receive low latency synchronized upstream transmissions and activating upstream transmissions during the activation window using the same channel. In some circumstances, low latency upstream transmissions may transmit during the activation window such that delays may be reduced or eliminated for the low latency upstream transmissions. Alternatively, or additionally, the spreading code may be configured to reduce collisions in an open contention grant setting as the OLT receiver may be configured to distinguish between two received upstream transmissions.

Embodiments of the present disclosure will be explained with reference to the accompanying drawings.

FIG. 1 illustrates a block diagram of an example passive optical network (PON) 100 configured to perform optical network unit activation and low latency transmissions in delay sensitive networks, in accordance with at least one embodiment described in the present disclosure. The PON 100 may include an optical line terminal (OLT) 105, a splitter 110, a first optical network unit (ONU) 115, a second ONU 120, and an nth ONU 125.

In some embodiments, the PON 100 may be configured to support low latency transmissions. For example, the PON 100 may be configured to support a 5G wireless fronthaul. The 5G wireless fronthaul may include intermediate links between a central controller and associated radios in a fifth-generation technology standard for mobile communication. Additionally, the 5G wireless fronthaul may include a one-way latency threshold of 160 µs. In some embodiments, one or more components in the PON 100 may be configured to support low latency transmissions. For example, in some embodiments, a downstream message may be simultaneously broadcast as a low latency downstream message to multiple ONUs, such as the first ONU 115, the second ONU 120, and the nth ONU 125. In another example, the first ONU 115, the second ONU 120, and the nth ONU 125 may be arranged and/or configured to transmit low latency upstream messages. In these and other embodiments, the PON 100 may be configured to implement one or more standards of passive optical networks. For example, the PON 100 may include 50G PON, 10G Ethernet PON (EPON), 10G Gigabit PON (GPON), and/or other variations of passive optical network standards.

In some embodiments, the OLT 105 may be configured to manage the allocation of upstream and downstream transmissions, which may contribute to the PON 100 supporting low latency communications. For example, the OLT 105 may be configured to cause downstream transmissions, such as a data message, to be broadcast to all connected ONUs in the PON 100, such as the first ONU 115, the second ONU 120, and the nth ONU 125. In another example, the OLT 105 may be configured to direct the transmission of upstream traffic, such as allocating windows for upstream transmission from the first ONU 115, the second ONU 120, and the nth ONU 125.

In some embodiments, the OLT 105 may be configured to transmit a transmission profile to the first ONU 115, the second ONU 120, and the nth ONU 125. In some embodiments, the transmission profile may be broadcast with a downstream transmission from the OLT 105 to the first ONU 115, the second ONU 120, and the nth ONU 125. In some embodiments, the transmission profile may include one or more details associated with upstream transmissions, such as an activation window and/or open contention grants. Additional details related to an activation window and open contention grants are further discussed herein.

In some embodiments, the OLT 105 may implement open contention grants, which may be configured to allow any of the first ONU 115, the second ONU 120, and/or the nth ONU 125 to transmit simultaneously such that any upstream transmission from the first ONU 115, the second ONU 120, and/or the nth ONU 125 may occur without an upstream transmission window assigned. For example, the first ONU 115 may be synchronized and may transmit a first upstream transmission and the second ONU 120 may be requesting activation and may transmit a second upstream transmission in the same transmission window. In another example, the first ONU 115 may be synchronized and may transmit a first upstream transmission and the second ONU 120 may be synchronized and may transmit a second upstream transmission in the same transmission window.

In some embodiments, the first upstream transmission and the second upstream transmission may collide at the OLT 105. For example, the first upstream transmission and the second upstream transmission may be received by the OLT 105 in overlapping time frames such that data from the first upstream transmission and the second upstream transmission may overlap and/or intermingle. In these and other embodiments, the first upstream transmission and the second upstream transmission may include one or more modifications such that in instances in which a collision may occur between the first upstream transmission and the second upstream transmission, the OLT 105 may be configured to distinguish between the first upstream transmission and the second upstream transmission. Additional details related to the modifications may be further illustrated and discussed relative to FIG. 3

In some embodiments, the splitter 110 may be configured to separate and/or distribute low latency downstream messages to each of the first ONU 115, the second ONU 120, and the nth ONU 125. For example, the splitter 110 may receive an input from the OLT 105, such as a low latency downstream message, and the splitter 110 may be configured to transmit the low latency downstream message to the first ONU 115, the second ONU 120, and the nth ONU 125.

In some embodiments, one or more of the first ONU 115, the second ONU 120, and/or the nth ONU 125 may be synchronized in the PON 100 such that the first ONU 115, the second ONU 120, and/or the nth ONU 125 may be configured to transmit upstream transmissions. For example, the first ONU 115, the second ONU 120, and/or the nth ONU 125 may be time synchronized in the PON 100 and may be configured to transmit upstream transmissions during an allocated time, which may be determined by the OLT 105.

Alternatively, or additionally, one or more of the first ONU 115, the second ONU 120, and/or the nth ONU 125 may not be synchronized in the PON 100 and may be configured to request activation in the PON 100. For example, the first ONU 115, the second ONU 120, and/or the nth ONU 125 in the PON 100 may attempt to join the PON 100 and may be configured to transmit a request for activation during a time period that may be determined by the OLT 105.

Alternatively, or additionally, one or more of the first ONU 115, the second ONU 120, and/or the nth ONU 125 in the PON 100 may be synchronized in the PON 100 and one or more of the first ONU 115, the second ONU 120, and/or the nth ONU 125 in the PON 100 may not be synchronized in the PON 100 and may request activation in the PON 100. For example, the first ONU 115 may be synchronized in the PON 100 and may be configured to transmit upstream transmissions and the second ONU 120 may not be synchronized in the PON 100 and may be configured to transmit an activation request in a transmission window which may be allocated by the OLT 105.

In some embodiments, each of the first ONU 115, the second ONU 120, and the nth ONU 125 may be configured to transmit an upstream transmission on a single channel. For example, the first ONU 115 may be configured to transmit an upstream transmission to the OLT 105 on an upstream channel and the second ONU 120 may be configured to transmit an upstream transmission to the OLT 105 on the upstream channel. Alternatively, or additionally, each of the first ONU 115, the second ONU 120, and the nth ONU 125 may include a spreading code that may provide more than one upstream channel. For example, the first ONU 115 may implement a first spreading code and the second ONU 120 may implement a second spreading code such that the first ONU 115 may transmit a first upstream transmission and the second ONU 120 may transmit a second upstream transmission, and both the first upstream transmission and the second upstream transmission may be received by the OLT 105. Additional details related to the spreading code may be further illustrated and discussed relative to FIG. 3.

In some embodiments, upstream transmissions from the first ONU 115, the second ONU 120, and/or the nth ONU 125 may include forward error correction (FEC) coding which may contribute to protecting the data of the upstream transmissions. In some embodiments, FEC coding may be implemented in high speed PON systems. In some embodiments, additional error correction coding may be included in a PON, such as the PON 100. For example, low-density parity check coding may be included in a PON including hard decision receivers and/or log-likelihood ratios (LLR) may be included in a PON including soft decision receivers.

In some embodiments, soft information may be derived from a binary signal. In some embodiments, the soft information may be obtained from a soft decision receiver, such as described relative to FIG. 4. The soft information may include multiple bits per symbol that may be obtained from an analog to digital converter (ADC) in the soft decision receiver. In some embodiments, the multiple bits per symbol may be a result from an application of the spreading code to a transmitted signal. Additionally, at the receiver, the error code demultiplexing may be performed by the following equation:

$$\hat{u}_t = \frac{1}{T_c} \sum_{i=1}^{T_c} \hat{x}_{T_c t + i} c_i.$$

In instances in which $\hat{x}$ is binary, (e.g., $\hat{x} \in \{-1, 1\}$), the received value $\hat{u}$ may include a multi-level signal (e.g., $\hat{u} \in \{-T_c, -T_c+2, \ldots, 0, \ldots, T_c-2, T_c\}$). In instances in which no transmission errors are associated with $\hat{x}$, $\hat{u}$ may include values $-T_c$ and $+T_c$, similar to a binary signal. Alternatively, or additionally, in instances in which transmission errors are associated with $\hat{x}$, $\hat{u}$ may include values between $-T_c$ and $+T_c$, which may be used in determining the soft information. In some embodiments, various LLR values may be associated with the values of $\hat{u}$, which may benefit from the soft information obtained during FEC decoding. In these and other embodiments, noise in the transmission may be reduced by taking an average over the $T_c$ symbols.

In some embodiments, the OLT 105 may be configured to quiet windows and/or activating windows. For example, in instances in which the first ONU 115 is an activating ONU and the second ONU 120 is a synchronized ONU, and both support spreading code, an activating window may be scheduled for activating upstream transmissions from the first ONU 115 and synchronized upstream transmissions from the second ONU 120. In instances in which the first ONU 115 is an activating ONU and does not support spreading code, the OLT 105 may schedule a quiet window in which activating upstream transmissions, such as an upstream transmission from the first ONU 115, may be transmitted.

In some embodiments, the PON 100 that is configured to support activating windows and quiet windows may include an increase amount of time between quiet windows. The increased time between quiet windows may reduce a number of opportunities for an ONU that transmits during quiet windows to activate in the PON.

In some embodiments, upstream transmissions, such as from the first ONU 115 to the OLT 105, may be organized in bursts. In some embodiments, the OLT 105 may be configured to transmit upstream transmission configurations to ONUs in the PON 100, such as the first ONU 115, the second ONU 120, and the nth ONU 125. In some embodiments, the OLT 105 may transmit the upstream transmission configurations in a downstream transmission, such as in a control channel. For example, a downstream transmission from the OLT 105 may include data in a data channel and/or upstream transmission configurations in a control channel.

In some embodiments, the upstream transmission configurations may include burst profiles and multiplex parameters that an ONU transmitting an upstream transmission may implement. In some embodiments, the burst profiles may include at least preamble content, a preamble length, and/or FEC settings. In some embodiments, the multiplex parameters may include at least spreading code sequence bits, spreading code sequence length, a transmit power reduction variable, interleaving settings, and/or a FEC code rate. In some embodiments, multiple spreading codes may be defined by the OLT 105 and an activating and/or synchronized ONU, such as the first ONU 115, may select one of the multiple spreading codes. In some embodiments, an ONU may be configured to randomly select a spreading code from the multiple spreading codes. For example, the first ONU 115 may randomly select a first spreading code of the multiple spreading codes and the second ONU 120 may randomly select a second spreading code of the multiple spreading codes, where the second spreading code may be the same or different than the first spreading code. Alternatively, or additionally, the OLT 105 may define one spreading code per burst profile and an activating ONU may be configured to transmit a serial number message with a random delay.

In these and other embodiments, one or more portions of an upstream transmission may include a bandwidth map. In some embodiments, the bandwidth map may include a transmit time for each synchronized ONU in the PON 100 and/or for each activating ONU not synchronized in the PON 100. Alternatively, or additionally, the bandwidth map may include a corresponding burst profile to be used by a transmitting ONU.

Modifications, additions, or omissions may be made to the PON 100 without departing from the scope of the present disclosure. For example, in some embodiments, the PON 100 may include any number of other components that may not be explicitly illustrated or described.

Figure 2A:
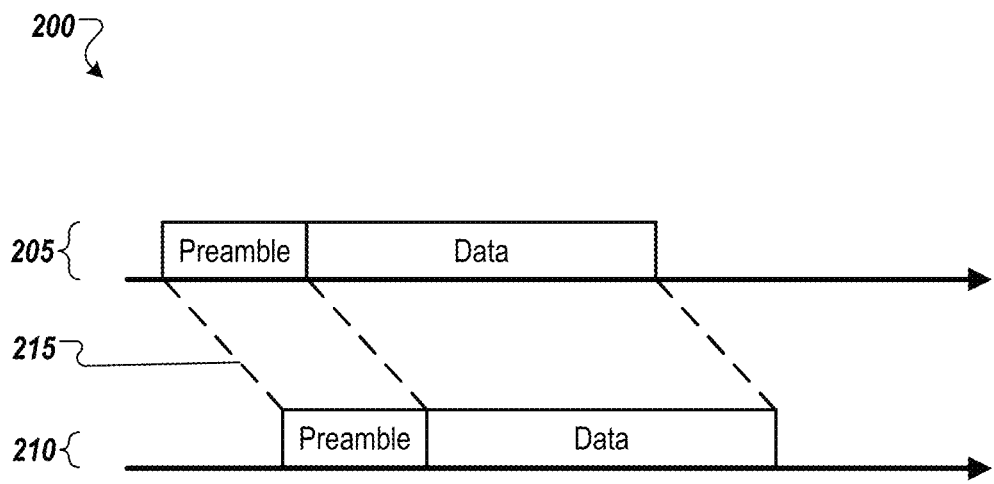
FIGS. 2A and 2B illustrates example timing diagrams in a passive optical network.

FIG. 2A illustrates an example downstream timing diagram 200 in a passive optical network, in accordance with at least one embodiment described in the present disclosure. The downstream timing diagram 200 may include an OLT 205, an ONU 210, and a downstream delay 215.

In some embodiments, the downstream timing diagram 200 may illustrate a downstream transmission from the OLT 205 to the ONU 210. In some embodiments, a downstream transmission from the OLT 205 may be transmitted to the ONU 210 that may be included in a PON, such as described relative to FIG. 1. In some embodiments, the downstream transmission from the OLT 205 may be received by the ONU 210. Although illustrated as a downstream transmission to only the ONU 210, a downstream transmission from the OLT 205 may be transmitted to multiple ONUs in the same transmission.

In these and other embodiments, the downstream delay 215 may indicate an amount of time that may pass between the OLT 205 transmitting the downstream transmission and the ONU 210 receiving the downstream transmission. In some embodiments, the downstream delay 215 may be unique for each ONU in the PON. For example, a downstream transmission from the OLT 205 to a first ONU may include a first delay and the downstream transmission from the OLT 205 to a second ONU may include a second delay. Alternatively, or additionally, the downstream delay 215 from a first ONU may be the same as the downstream delay 215 from a second ONU. For example, a downstream transmission from the OLT 205 to a first ONU may include a first delay and the downstream transmission from the OLT 205 to a second ONU may include the first delay.

In some embodiments, the amount of downstream delay 215 between the OLT 205 and the ONU 210 may be determined by one or more characteristics of the transmission channel between the OLT 205 and the ONU 210. For example, a physical length between the OLT 205 and the ONU 210, the channel medium, an amount of included noise in the channel, and/or other transmission channel characteristics may contribute to the downstream delay 215.

Modifications, additions, or omissions may be made to the downstream timing diagram 200 without departing from the scope of the present disclosure. For example, in some embodiments, the downstream timing diagram 200 may include any number of other components that may not be explicitly illustrated or described.

Figure 2B:
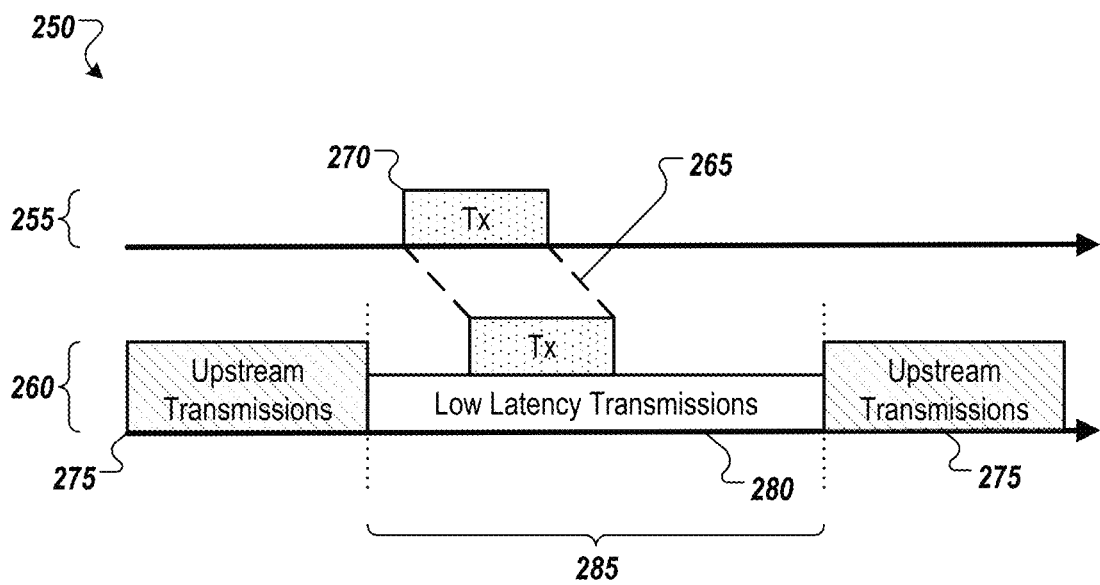

FIG. 2B illustrates an example upstream timing diagram 250 in a passive optical network, in accordance with at least one embodiment described in the present disclosure. The upstream timing diagram 250 may include an ONU 255, an OLT 260, an upstream delay 265, an upstream transmission 270, synchronized upstream transmissions 275, low latency transmissions 280, and an activation window 285.

In some embodiments, the upstream timing diagram 250 may illustrate the upstream transmission 270 from the ONU 255 to the OLT 260. In some embodiments, the upstream transmission 270 may include the upstream delay 265. In some embodiments, the upstream delay 265 may be the same or similar as the downstream delay between the ONU 255 and the OLT 260, as illustrated in FIG. 2A by the downstream delay 215 between the OLT 205 and the ONU 210. Alternatively, or additionally, the upstream delay 265 may be longer or shorter than the downstream delay 215. For example, the upstream delay 265 may include additional processing time by the ONU 255 and/or other random delays which may cause the upstream delay 265 to differ from the downstream delay 215.

In some embodiments, the upstream transmission 270 may include a request for the ONU 255 to be activated in the PON. For example, the ONU 255 may be an activating ONU that may not be synchronized with the OLT 260 in the PON and the ONU 255 may transmit the upstream transmission 270 to become synchronized with the OLT 260.

In some embodiments, the OLT 260 may be configured to receive the synchronized upstream transmissions 275. The synchronized upstream transmissions 275 may be transmissions from one or more ONUs that have been synchronized with the OLT 260. In some embodiments, the OLT 260 may include a scheduled window in which the synchronized upstream transmissions 275 may not be transmitted. The activating window 285 may illustrate the scheduled window in which the synchronized upstream transmissions 275 may not transmit.

Alternatively, or additionally, the activating window 285 may permit transmissions from activating ONUs, such as the upstream transmission 270 from the ONU 255. For example, an activating ONU (e.g., an ONU not synchronized with the OLT 260) may be permitted to transmit an upstream transmission during the activating window 285. In some embodiments, more than one activating ONU may be permitted to transmit an upstream transmission during the activating window 285.

Alternatively, or additionally, the activating window 285 may permit the low latency transmissions 280 from a synchronized ONU that may include high priority traffic. For example, a first ONU including low latency transmissions 280 may be permitted to transmit during the activating window 285 and a second ONU including non-low latency transmissions may not be permitted to transmit during the activating window 285. In some embodiments, the low latency transmissions 280 may be transmitted at a decreased data rate during the activating window 285. For example, spreading code may be multiplexed with the low latency transmissions 280 and may decrease the data rate of the low latency transmission 280, as described herein.

In some embodiments, the activating window 285 may be periodically scheduled during upstream transmissions. For example, the OLT 260 may periodically schedule the activating window 285 for activating ONUs to transmit the upstream transmission 270 and/or for some synchronized ONUs to transmit the low latency transmissions 280.

In some embodiments, the ONU 255 may be configured to transmit the upstream transmission 270 during the activating window 285. The upstream transmission 270 may be disposed at any portion of the activating window 285. For example, the upstream transmission 270 may be disposed at a beginning portion, an end portion, or any portion therebetween of the activating window 285. In some embodiments, the ONU 255 may be configured to begin transmission of the upstream transmission 270 prior to the activating window 285 in anticipation of the upstream delay 265. For example, the ONU 255 may transmit the upstream transmission 270 by an amount up to or equal to the upstream delay 265 prior to the start of activating window 285.

In some embodiments, spreading code may be multiplexed with a transmission during the activating window 285. For example, the upstream transmission 270 may include multiplexed spreading code and/or the low latency transmissions 280 may include multiplexed spreading code. The spreading code may be the same for the upstream transmission 270 and the low latency transmissions 280. Alternatively, or additionally, the spreading code may differ between the upstream transmission 270 and the low latency transmissions 280.

In some embodiments, the spreading code may be arranged such that the low latency transmissions 280 may maintain a data rate and/or a bit error rate above a threshold. For example, a first low latency transmission may be sent at a first data rate greater than a first threshold, and the spreading code multiplexed with the first low latency transmission may reduce the data rate to a second data rate that is still greater than the first threshold. In some embodiments, the spreading code may be arranged such that interference between an activating ONU and a synchronized ONU may be partially, substantially, or completely canceled out, as described herein. Alternatively, or additionally, the spreading code may be arranged such that overlapping upstream transmissions from multiple activating ONUs (e.g., a first upstream transmission from a first ONU and a second upstream transmission from a second ONU during the same period of time) may be separated by the OLT 260.

Modifications, additions, or omissions may be made to the upstream timing diagram 250 without departing from the scope of the present disclosure. For example, in some embodiments, the upstream timing diagram 250 may include any number of other components that may not be explicitly illustrated or described.

Figure 3:
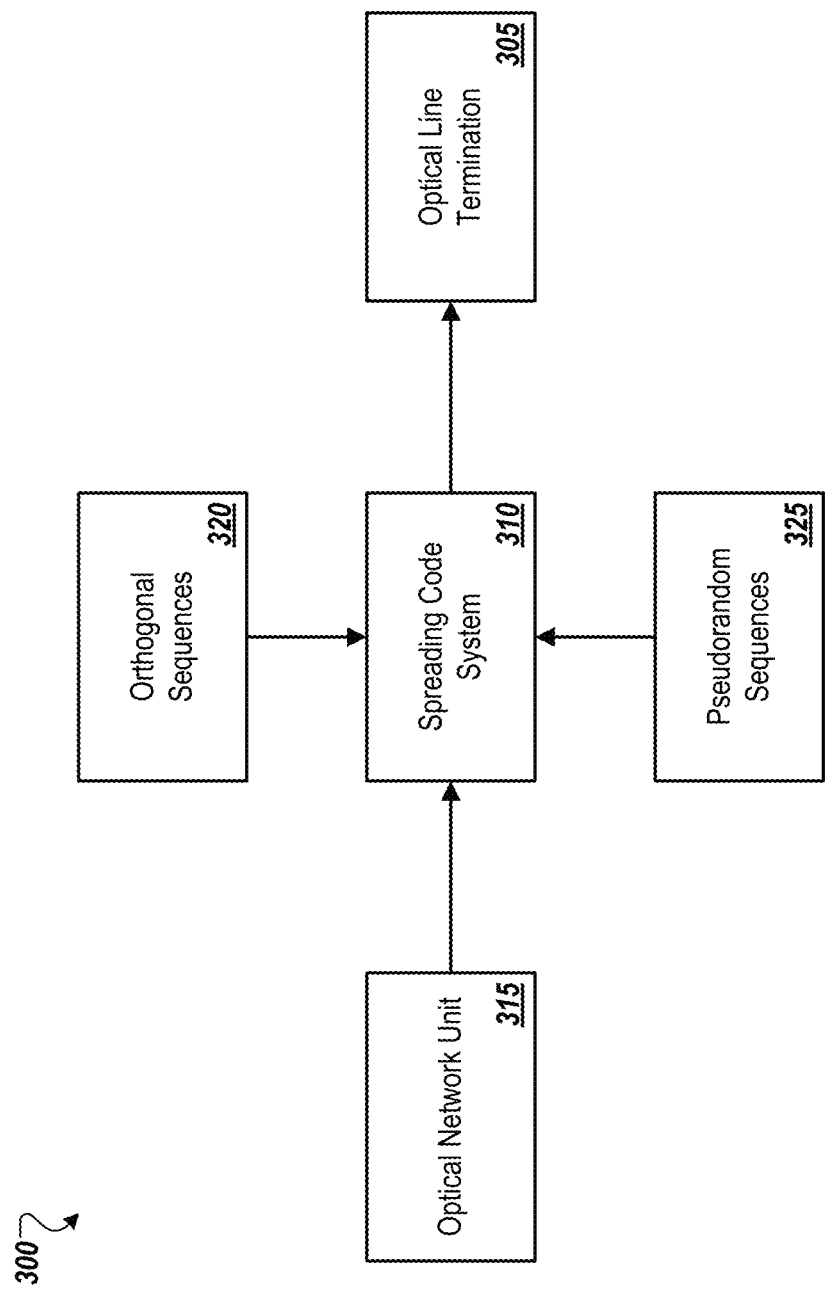
FIG. 3 illustrates a block diagram of an example passive optical network configured to apply spreading code to an upstream transmission.

FIG. 3 illustrates a block diagram of an example passive optical network (PON) 300 configured to apply spreading code to an upstream transmission, in accordance with at least one embodiment described in the present disclosure. The PON 300 may include an optical line terminal (OLT) 305, a spreading code system 310, an optical network unit (ONU) 315, orthogonal sequences 320, and pseudorandom sequences 325.

In some embodiments, one or more elements of the PON 300 may be the same or similar as one or more elements of the PON 100 of FIG. 1. For example, the OLT 305 and the ONU 315 may be the same or similar as the OLT 105 and any of the first ONU 115, the second ONU 120, and/or the nth ONU 125 of FIG. 1, respectively. In some embodiments, the ONU 315 may be synchronized in a passive optical network, or the ONU 315 may be requesting activation within the passive optical network.

In some embodiments, the spreading code system 310 may be configured to perform a modification to an incoming data stream, such as an upstream transmission. For example, an upstream transmission from the ONU 315 may be input to and modified by the spreading code system 310 and transmitted to the OLT 305. In some embodiments, the spreading code system 310 may include at least two spreading codes, including the orthogonal sequences 320 and the pseudorandom sequences 325.

In some embodiments, the orthogonal sequences 320 may include $T_c$ mutually orthogonal sequences of length $T_c$. For example, the sequences $c_1 = [1\ 1]^T$ and $c_2 = [1\ -1]^T$ may be two orthogonal sequences 320 that may be used as spreading codes. In some embodiments, the orthogonal sequences 320 may be configured such that the influence of one upstream transmission including a first orthogonal sequence may be canceled out from another upstream transmission including a second orthogonal sequence, when received by the OLT 305. In some embodiments, the canceling out of other upstream transmissions may be operable when some or all the upstream transmissions are time synchronized. For example, in instances in which a first ONU in a PON is synchronized and transmitting a first upstream transmission and a second ONU in the PON is activating (e.g., not synchronized) and transmitting a second upstream transmission, applying the orthogonal sequences 320 to the first upstream transmission and the second upstream transmission may not enable an OLT in the PON to cancel out the influence of the second upstream transmission from the first upstream transmission.

In some embodiments, the pseudorandom sequences 325 applied to one or more upstream transmissions may be configured to partially cancel out interference from other upstream transmissions including the pseudorandom sequences 325. For example, a first upstream transmission from a first ONU that includes a first pseudorandom sequence may partially cancel out a second upstream transmission from a second ONU that includes a second pseudorandom sequences when received by the OLT 305. In some embodiments, the pseudorandom sequences 325 may work with upstream transmissions from ONUs that may not be time synchronized in a PON. For example, in instances in which a first ONU in a PON is synchronized and transmitting a first upstream transmission and a second ONU in the PON is activating (e.g., not synchronized) and transmitting a second upstream transmission, applying the pseudorandom sequences 325 to the first upstream transmission and the second upstream transmission may enable an OLT in the PON to at least partially cancel out the influence of the second upstream transmission from the first upstream transmission.

In some embodiments, a limited number of the pseudorandom sequences 325 may be available to be multiplexed with upstream transmissions, which are provided as follows.

For pseudorandom sequences 325 including seven elements, two codes are included:

$$c_1 = [1\ 1\ 1\ -1\ 1\ -1\ -1]^T$$

$$c_2 = [1\ -1\ 1\ 1\ 1\ -1\ -1]^T.$$

For pseudorandom sequences 325 including fifteen elements, two codes are included:

$$c_1 = [1\ 1\ 1\ 1\ -1\ 1\ -1\ 1\ 1\ -1\ -1\ 1\ -1\ -1\ -1]^T$$

$$c_2 = [1\ -1\ -1\ 1\ 1\ -1\ 1\ -1\ 1\ 1\ 1\ 1\ -1\ -1\ -1]^T.$$

For pseudorandom sequences 325 including twenty-three elements, two codes are included:

$$c_1 = [1\ 1\ 1\ 1\ 1\ -1\ 1\ -1\ 1\ 1\ -1\ -1\ 1\ 1\ -1\ -1\ 1\ 1\\ -1\ -1\ -1\ -1]^T$$

$c_2$=[1 -1 1 -1 -1 1 1 -1 -1 1 1 1 -1 1 -1 1 1 1 1 1 1
      -1 -1 -1 -1$]^T$.

For pseudorandom sequences 325 including thirty-one elements, eight codes are included:

$c_1$=[1 1 1 -1 1 -1 1 -1 -1 -1 1 1 1 1 -1 1 1 -1 1
      1 1 -1 -1 1 -1 -1 1 -1 -1 -1 -1$]^T$ $c_2$=[1 -1 1 -1 1 1 1 -1 1 1 -1 -1 -1 1 1 1 1 1 -1
      -1 1 1 -1 1 -1 -1 1 -1 -1 -1 -1$]^T$ $c_3$=[1 -1 -1 1 -1 1 1 1 -1 1 1 1 1 1 1 -1 -1 -1 1 1
      -1 1 1 1 -1 1 -1 1 -1 -1 -1 -1$]^T$ $c_4$=[1 1 -1 -1 1 -1 -1 1 1 1 1 1 1 -1 1 1 1 -1 -1 -1
      1 -1 1 -1 1 1 -1 1 -1 -1 -1 -1$]^T$ $c_5$=[1 -1 1 1 1 -1 1 -1 1 -1 -1 -1 1 1 1 1 -1 1 1 1 1
      1 -1 -1 1 1 -1 1 1 1 -1 -1 -1 -1$]^T$ $c_6$=[1 1 1 1 -1 -1 1 1 1 -1 1 1 1 1 1 1 -1 1 -1 -1 1 1
      -1 1 1 -1 1 1 -1 1 1 1 -1 -1 -1 -1$]^T$ $c_7$=[1 1 -1 1 1 -1 1 -1 1 1 -1 -1 -1 1 1 -1 1 1 1 1 1 1
      -1 1 1 1 -1 1 1 1 1 1 -1 -1 -1 -1$]^T$ $c_8$=[1 -1 -1 1 -1 -1 1 1 1 -1 1 1 1 -1 1 1 1 1 -1 -1
      -1 1 -1 1 -1 1 1 1 -1 -1 -1 -1$]^T$.

In some embodiments, the spreading code system 310 may be configured to apply a spreading code to an upstream transmission by modifying bits of the upstream transmission. For example, given an input signal $u_t$, spreading codes $c_1=[1\ 1]^T$ and $c_2=[1\ -1]^T$, and an upstream transmission $x_t$, the spreading code system 310 may repeat each bit of $u_t$ $T_c$ times and multiply each bit by the spreading codes such that $x_{2t+tc,n}=u_t\ c_{tc,n}$. Illustrated another way, given $u_t$, $c_1=[1\ 1]^T$ and $c_2=[1\ -1]^T$, and $x_t$, a first channel may be configured to transmit $x_t = \ldots u_{t-1,1}\ u_{t-1,1}\ u_{t,1}\ u_{t,1}\ u_{t+1,1}\ u_{t+1,1} \ldots$ and a second channel may be configured to transmit $x_t = \ldots u_{t-1,2}\ -u_{t-1,2}\ u_{t,2}\ -u_{t,2}\ u_{t+1,2}\ -u_{t+1,2} \ldots$.

In some embodiments, a receiver, such as the OLT 305, may be configured to recover the upstream transmissions. For example, given a received signal $y_t$, the OLT 305 may be configured to determine the input signal $\hat{u}_t$ may be represented by $\hat{u}_{t,1}=(y_{2t+1}+y_{2t+2})/2$ and $\hat{u}_{t,2}=(y_{2t+1}-y_{2t+2})/2$.

In some embodiments, characteristics and/or transmission requirements associated with a first ONU transmitting a first upstream transmission may differ from the characteristics and/or transmission requirements associated with a second ONU transmitting a second upstream transmission. For example, a first ONU may include low latency and/or high data rate transmissions and may be synchronized in the PON and a second ONU may include arbitrarily timed and/or low data rate transmissions and may not be synchronized in the PON. In some embodiments, the spreading code system 310 may multiplex short spreading codes with upstream transmissions that include low latency and/or high data rate transmissions and the spreading code system 310 may multiplex long spreading codes with upstream transmissions that include arbitrarily timed and/or low data rate transmissions. Alternatively, or additionally, the spreading code system 310 may multiplex long or short spreading codes with low latency and/or high data rate transmissions and may multiplex long or short spreading codes with arbitrarily timed and/or low data rate transmissions.

In these and other embodiments, the spreading code system 310 may be configured to multiplex different spreading codes to upstream transmissions from different ONUs. For example, the spreading code system 310 may multiplex a short spreading code, such as $c=[1\ -1]^T$ with upstream transmissions from a synchronized ONU and may multiplex a long spreading code, such as $c=[1\ -1\ 1\ -1]^T$ with upstream transmissions from an activating ONU. In these and other embodiments, the length of the spreading code applied by the spreading code system 310 may alter the bandwidth of the transmission channel used for an upstream transmission. For example, the spreading code $c=[1\ -1]^T$ may cause the channel bandwidth to be halved.

In some embodiments, the spreading code system 310 may be configured to use a spreading code that includes a combination of the orthogonal sequences 320 and the pseudorandom sequences 325. For example, the spreading code system 310 may mulitplex a spreading code with an upstream transmission from an activating ONU, where the spreading code includes a combination of a seven element pseudorandom sequence and an orthogonal sequence such as:

$c_1$=[1 1 1 1 1 1 1 1 1 1 1 1 -1 -1 -1 -1 1 1 1 1 -1
      -1 -1 -1 -1 -1 -1 -1$]^T$ $c_2$=[1 1 1 1 -1 -1 -1 -1 1 1 1 1 1 1 1 1 1 1 1 -1
      -1 -1 -1 -1 -1 -1 -1$]^T$.

Modifications, additions, or omissions may be made to the PON 300 without departing from the scope of the present disclosure. For example, in some embodiments, the PON 300 may include any number of other components that may not be explicitly illustrated or described.

Figure 4:
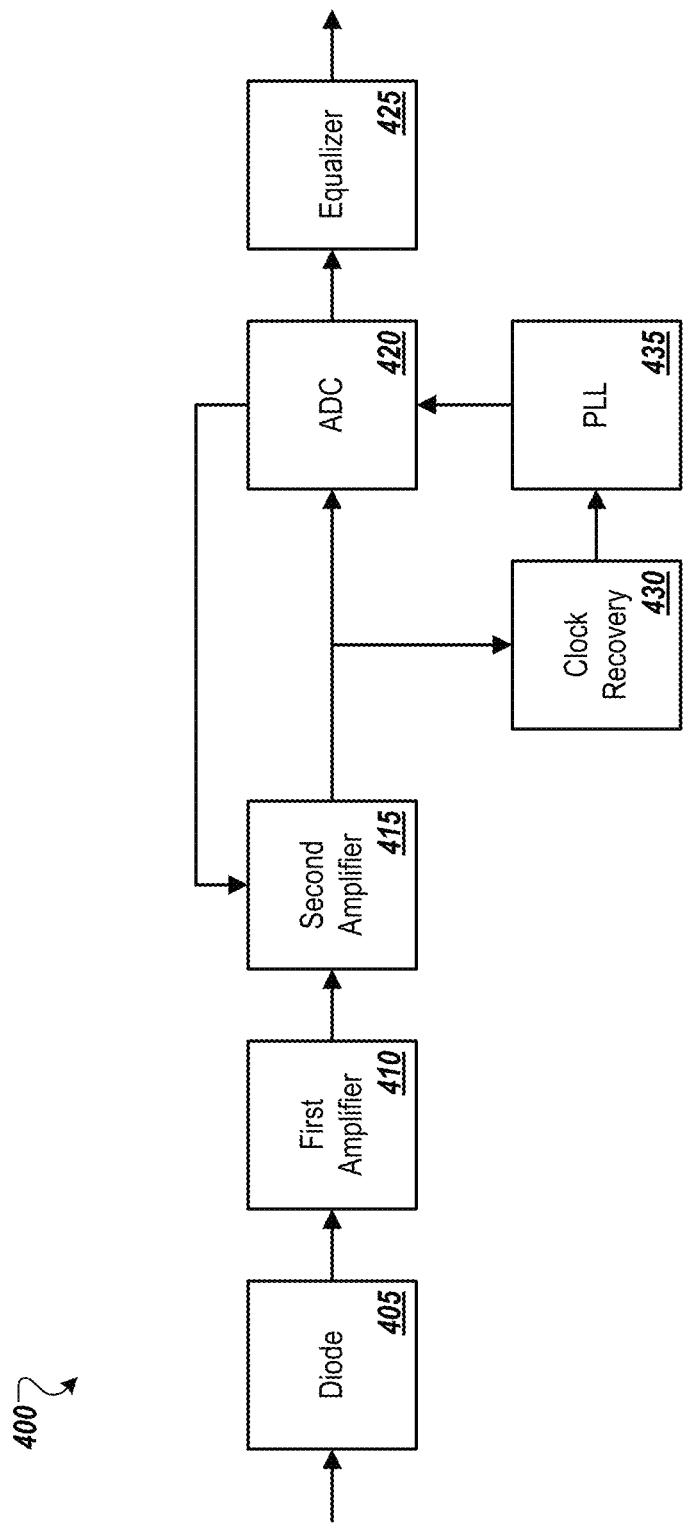
FIG. 4 illustrates an example soft decision receiver.

FIG. 4 illustrates an example soft decision receiver 400, in accordance with at least one embodiment described in the present disclosure. The soft decision receiver 400 may include a diode 405, a first amplifier 410, a second amplifier 415, an ADC 420, an equalizer 425, a clock recovery 430, and a phase-locked loop 435.

In some embodiments, the soft decision receiver 400 may be included in an OLT, such as the OLT 105 of FIG. 1. The soft decision receiver 400 may be included in PON systems that include various operating data rates, such as high data rates including 50 Gbit/s. In some embodiments, the soft decision receiver 400 may be configured to receive an upstream transmission, such as from an ONU. The soft decision receiver 400 may be configured to recover an input signal that may have been modified in conjunction with the upstream transmission, as described herein.

In some embodiments, an optical signal, such as an upstream transmission, may be input into the diode 405. In some embodiments, the diode 405 may be configured to covert an optical signal to an electrical signal. For example, an upstream transmission may include an optical signal which may be received and converted into an electrical signal by the diode 405. In some embodiments, the diode 405 may include a photo optical diode, such as an avalanche photo diode.

In some embodiments, an output from the diode 405 may be input into the first amplifier 410 to amplify the electrical signal obtained by the diode 405. In some embodiments, a trans-impedance amplifier may be used as the first amplifier 410.

In some embodiments, an output from the first amplifier 410 may be input into the second amplifier 415. The second amplifier 415 may be configured to amplify the signal output from the first amplifier to an amplitude above a threshold for the ADC 420. In some embodiments, the second amplifier 415 may include a variable gain amplifier, which may be used in conjunction with an automatic gain control feedback system. In some embodiments, the clock recovery 430 and the phase-locked loop 435 may be configured to operate in conjunction with the second amplifier 415 and the ADC 420 as the automatic gain control feedback system.

In some embodiments, the ADC 420 may be configured to convert the received signal from the second amplifier 415 into an output signal $y_t$. In some embodiments, the output signal $y_t$ may include inter-symbol interference which may distort or degrade the accuracy of the output signal $y_t$ relative to the input signal that was transmitted as the upstream transmission. In these and other embodiments, the output signal $y_t$ may be input into the equalizer 425 which may partially, substantially, or completely mitigate the inter-symbol interference. The equalizer 425 may output an equalized signal $\hat{x}_t$ which may be used to determine the transmitted signals in the upstream transmission by removing the spreading code that was included in the upstream transmission. For example, a recovered symbol a may be obtained by the following:

$$\hat{u}_t = \frac{1}{T_c} \sum_{i=1}^{T_c} \hat{x}_{T_c t+i} c_i.$$

In some embodiments, the soft decision receiver 400 may be synchronized with a bit stream of a low latency upstream transmission, such as from a synchronized ONU. Alternatively, or additionally, the soft decision receiver 400 may not be synchronized with an upstream transmission from an activating ONU. In some embodiments, the soft decision receiver 400 may be configured to sample an upstream transmission from an activating ONU using a timing reference from the synchronized ONU. In these and other embodiments, the length of the spreading code used with the upstream transmission from the activating ONU may be the same or longer than the length of the spreading code used with the upstream transmission from the synchronized ONU. For example, the spreading code used with an activating ONU may include a length of four and the spreading code used with a synchronized ONU may include a length of two. In another example, the spreading code used with an activating ONU may include a length of seven and the spreading code used with a synchronized ONU may include a length of four. In another example, the spreading code used with an activating ONU may include a length of four and the spreading code used with a synchronized ONU may include a length of four. Other combinations of spreading code lengths for activating ONUs and synchronized ONUs may also be used such that the length of the spreading code for the activating ONU may be the same or longer than the length of the spreading code for the synchronized ONU.

In some embodiments, variations to the spreading code may be implemented to contribute to the soft decision receiver 400 distinguishing between a synchronized ONU upstream transmission and an activating ONU upstream transmission. For example, an alternating spreading code may be used with both the synchronized ONU upstream transmission and the activating ONU upstream transmission. Alternatively, or additionally, variable length spreading codes may be used, such as described herein, for the synchronized ONU upstream transmission and the activating ONU upstream transmission. Alternatively, or additionally, combinations of the alternating spreading code and the variable length spreading codes may be used for the synchronized ONU upstream transmission and the activating ONU upstream transmission. For example, the synchronized ONU may include a spreading code $c_s$=[1 −1] and the activating ONU may include a spreading code $c_a$=[1 1 1 1 −1 −1 −1 −1, . . . ].

In these and other embodiments, the alternating spreading codes and/or the variable length spreading codes may contribute to the soft decision receiver 400 receiving an upstream transmission from an activating ONU that may include arbitrary timing. For example, each bit in the upstream transmission from an activating ONU may be repeated multiple times which may reduce the probability of the bits of the upstream transmission being corrupted. Alternatively, or additionally, a number of edges in the upstream transmission from an activating ONU may be below a threshold which may reduce the probability of the bits of the upstream transmission being corrupted.

In some embodiments, the spreading code applied to the upstream transmission from the synchronized ONU may increase the signal-to-noise ratio (SNR) of the upstream transmission. For example, a spreading code that includes a length of two may increase the SNR by approximately 3 dB or more.

Modifications, additions, or omissions may be made to the soft decision receiver 400 without departing from the scope of the present disclosure. For example, in some embodiments, the soft decision receiver 400 may include any number of other components that may not be explicitly illustrated or described.

Figure 5:
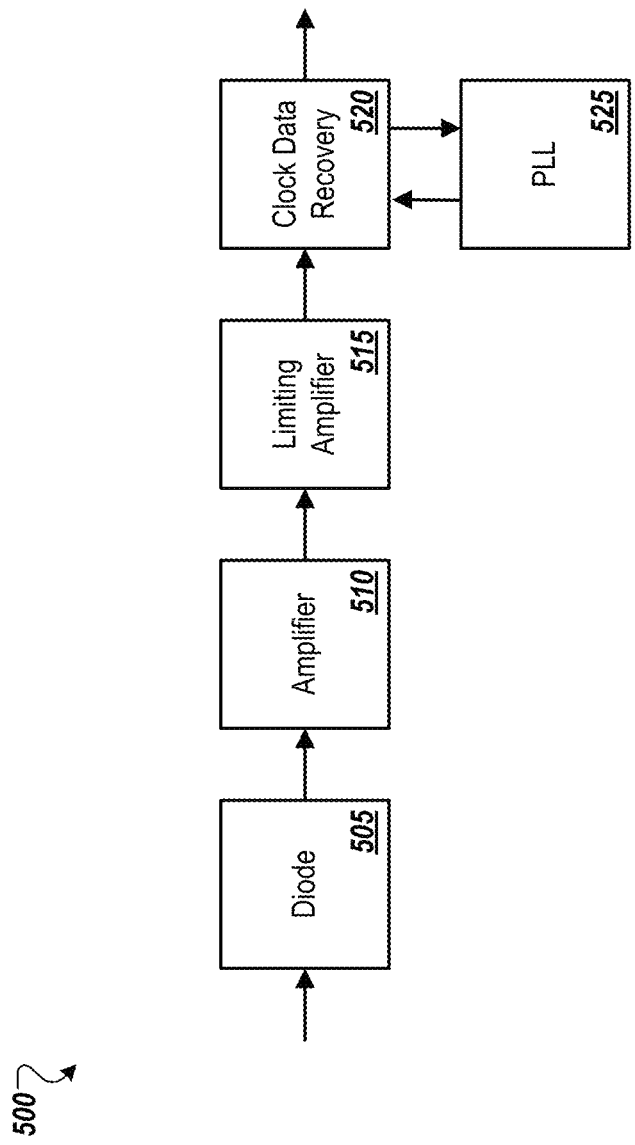
FIG. 5 illustrates an example hard decision receiver.

FIG. 5 illustrates an example hard decision receiver 500, in accordance with at least one embodiment described in the present disclosure. The hard decision receiver 500 may include a diode 505, an amplifier 510, a limiting amplifier 515, a clock data recovery 520, and a phase-locked loop 525.

In some embodiments, one or more elements of the hard decision receiver 500 may be the same or similar as one or more elements of the soft decision receiver 400 of FIG. 4. For example, the diode 505, the amplifier 510, and the phase-locked loop 525 may be the same or similar as the diode 405, the first amplifier 410, and the phase-locked loop 435 of FIG. 4.

In some embodiments, the hard decision receiver 500 may be included as a receiver in an OLT, such as the OLT 105 of FIG. 1. The hard decision receiver 500 may be included in PON systems that include various operating data rates, such as high data rates including 50 Gbit/s. In some embodiments, the hard decision receiver 500 may be configured to receive an upstream transmission, such as from an ONU. The hard decision receiver 500 may be configured to recover an input signal that may have been modified in conjunction with the upstream transmission, as described herein.

In some embodiments, the limiting amplifier 515 may be configured to make a hard decision as to an observed signal based on a received signal. The received signal may include an output from the amplifier 510, which may be obtained from the diode 505 and from a received upstream transmission. For example, the limiting amplifier 515 may include a threshold such that an observed value above the threshold may be determined to be a first value and an observed value below the threshold may be determined to be a second value. In some embodiments, the clock data recovery 520 and the phase-locked loop 525 may be configured to adjust the threshold of the limiting amplifier. In some embodiments, the hard decision receiver 500 may be configured to recover a symbol a using the same equation associated with the soft decision receiver 400:

$$\hat{u}_t = \frac{1}{T_c} \sum_{i=1}^{T_c} \hat{x}_{T_c t + i} c_i.$$

In some embodiments, the symbol a may include a multi-level signal, which may include additional information. The additional information may be used as part of forward error correction coding, as discussed herein.

In some embodiments, the threshold of the limiting amplifier 515 may be adjusted such that the hard decision receiver 500 may be configured to receive upstream transmissions from a synchronized ONU and an activating ONU. Alternatively, or additionally, the threshold of the limiting amplifier 515 may be turned to account for a signal strength associated with an upstream transmission from a synchronized ONU being stronger than a signal strength associated with an upstream transmission from an activating ONU. Additional details associated with the threshold may be further discussed in relation to FIG. 10, FIG. 11, and/or FIG. 12, as described herein.

Figure 10:
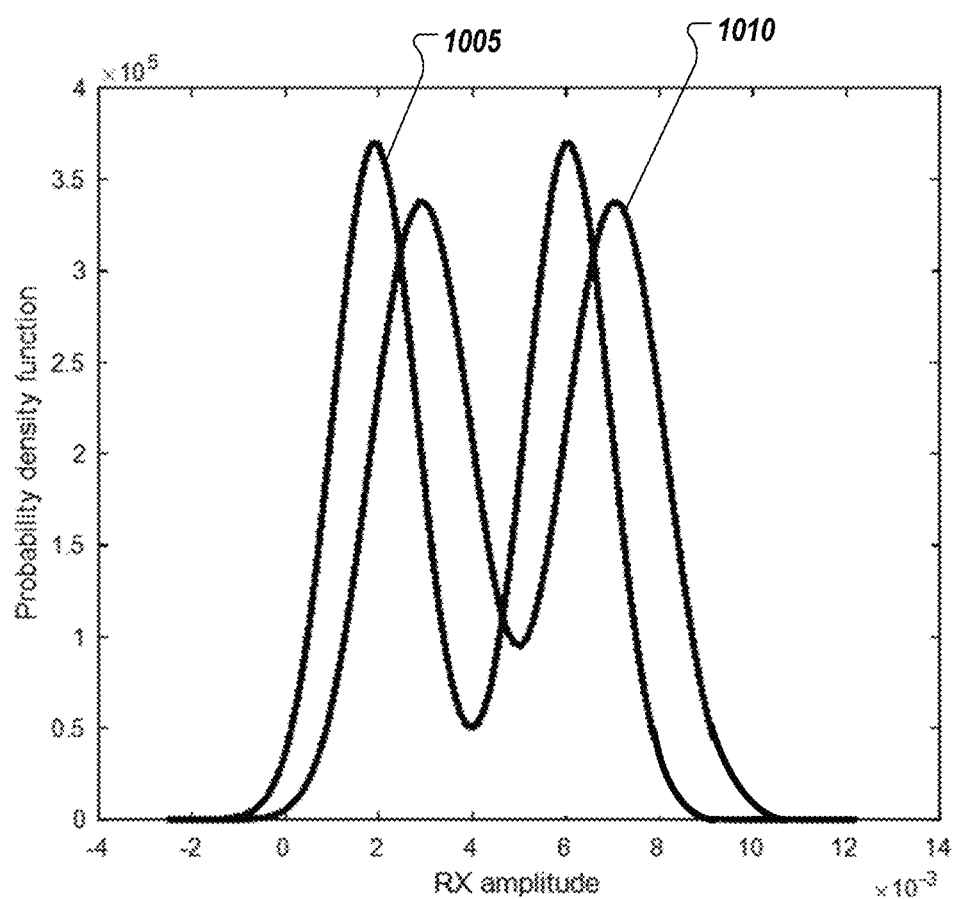
FIG. 10 illustrates an example signal probability density function.
Figure 11:
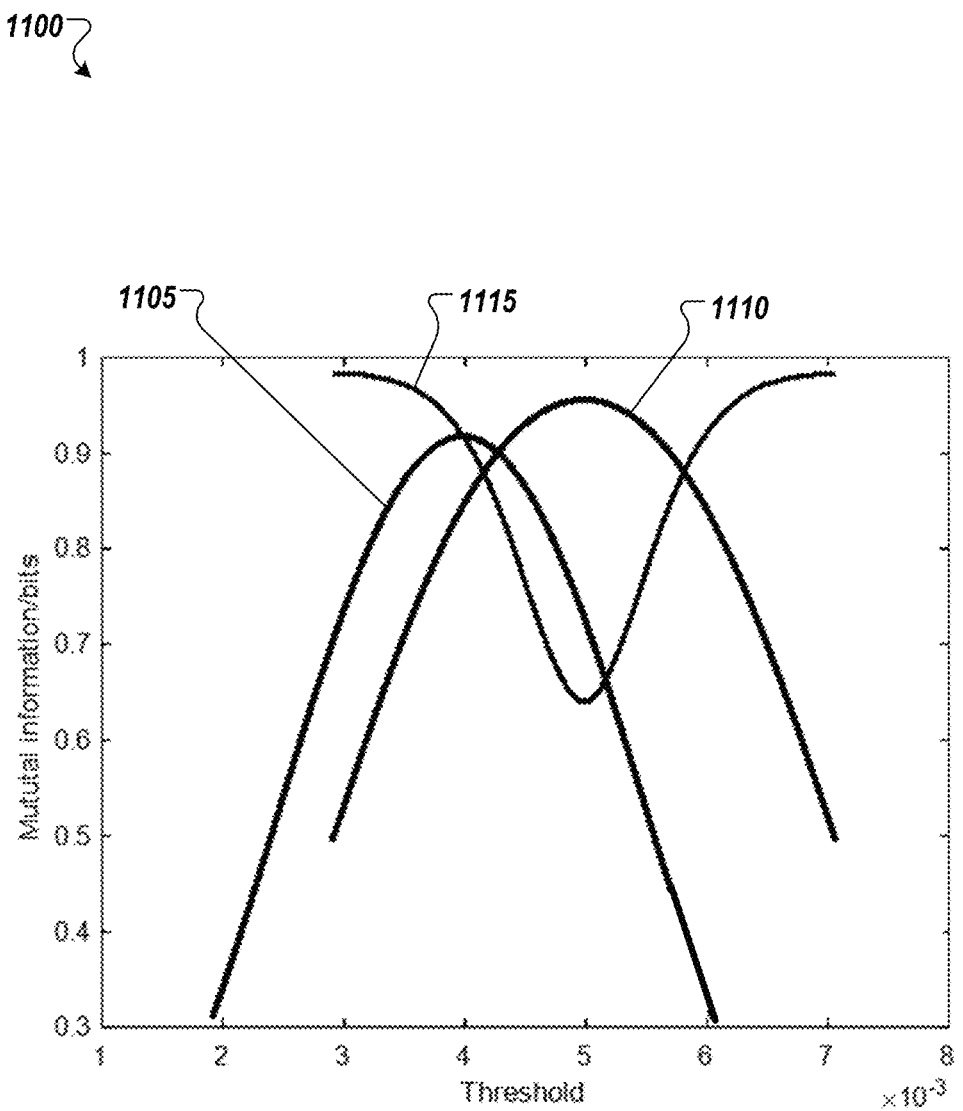
FIG. 11 illustrates an example mutual information and decision threshold graph.
Figure 12:
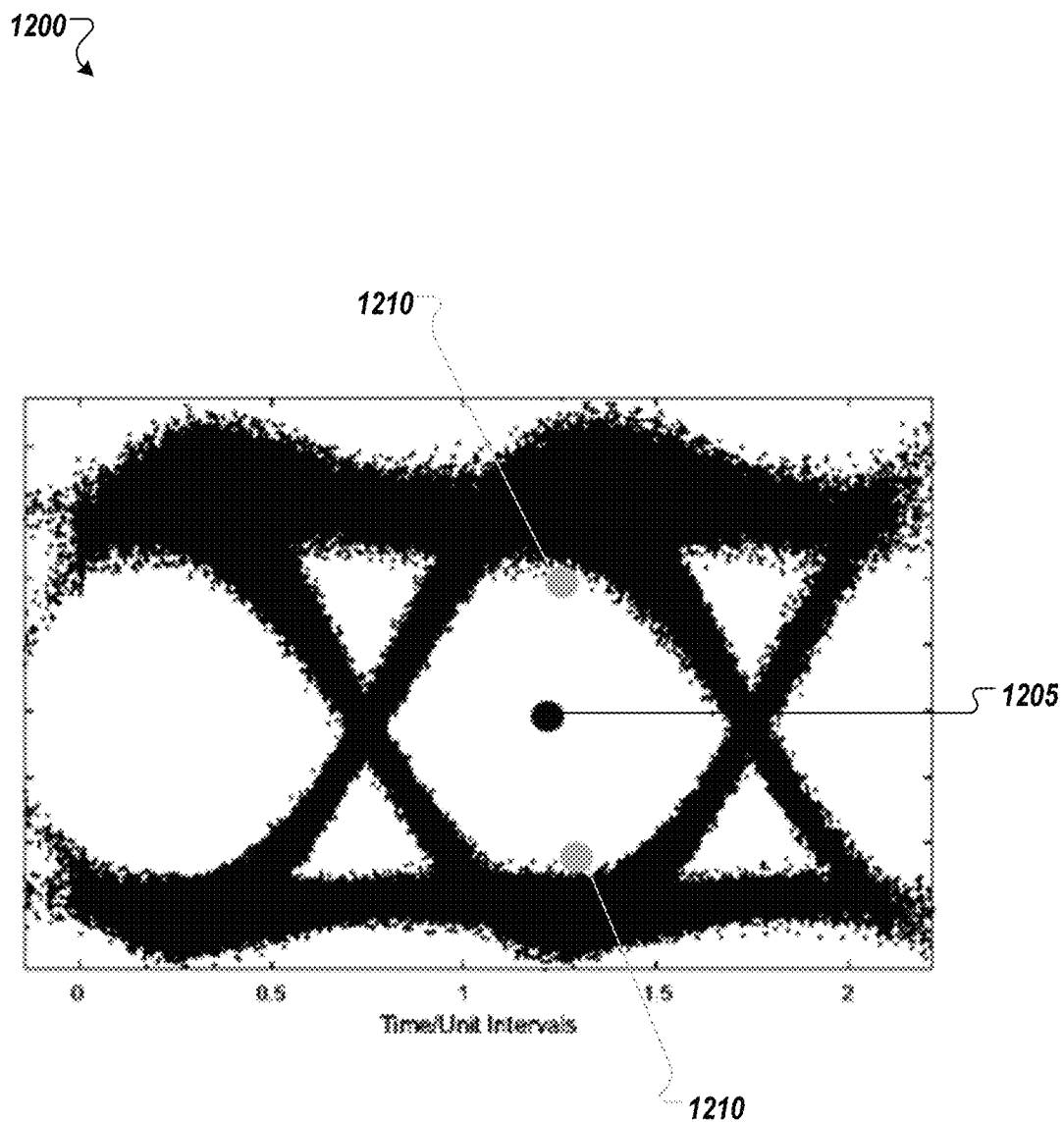
FIG. 12 illustrates an example eye diagram of a passive optical network receiver.

FIG. 10 illustrates an example signal probability density function 1000, in accordance with at least one embodiment described in the present disclosure. The signal probability density function 1000 may include a first signal 1005 and a second signal 1010. FIG. 11 illustrates an example mutual information and decision threshold graph 1100, in accordance with at least one embodiment described in the present disclosure. The mutual information and decision threshold graph 1100 may include a first signal 1105, a second signal 1110, and a third signal 1115. FIG. 12 illustrates an example eye diagram 1200 of a passive optical network receiver, in accordance with at least one embodiment described in the present disclosure. The eye diagram 1200 may include a first decision point 1205 and second decision point 1210.

In some embodiments, FIG. 10, FIG. 11, and/or FIG. 12 may explain the threshold issue in instances in which an upstream transmission from an activating ONU is approximately 6 dB weaker than an upstream transmission from a synchronized ONU. For example, FIG. 10 illustrates the signal probability density function 1000 of one or more received signals at an OLT. As illustrated, the first signal 1005 may be associated with an upstream transmission from a synchronized ONU, and the second signal 1010 may be associated with simultaneous or near simultaneous transmissions of an upstream transmission from the synchronized ONU and an upstream transmission the activating ONU.

In some embodiments, the first signal 1005 (e.g., associated with an upstream transmission from the synchronized ONU) may include an optimal threshold that may be at approximately 4e-3, as illustrated by the first signal 1105 of the mutual information and decision threshold graph 1100 in FIG. 11. The optimal threshold at 4e-3 in FIG. 11 may be a point that maximizes or nearly maximizes the mutual information of the first signal 1105 in FIG. 11.

In instances in which a synchronized ONU and an activating ONU transmit in an activation window, the receive power distribution may move to a higher value, illustrated by the second signal 1010 in FIG. 10, as both the upstream transmission from the synchronized ONU and the upstream transmission from the activating ONU overlap.

FIG. 11 illustrates mutual information including a tradeoff between the quality of the low latency channel of the synchronized ONU and the channel quality of the activating ONU. For example, for thresholds between 4.5e-3 and 5.5e-3, the channel quality of the synchronized ONU channel in the activation window is equal or better than the channel quality of a regular transmission outside of the activation window.

Alternatively, or additionally, the optimal threshold for the low latency traffic at 5e-3 may result in a diminished quality of the activating ONU channel. For example, in instances in which the threshold value is optimal for the low latency traffic, the threshold may be less sensitive for the weaker signal of an activating ONU, such that the quality of the activating ONU channel may be diminished.

The diminished activating ONU channel may be explained in the eye diagram illustrated in FIG. 12. In some embodiments, an optimal decision point for the stronger signal of a synchronized ONU, which may be stronger than a signal from an activating ONU, may be in the center of the eye, such as the first decision point 1205. In some embodiments, the first decision point 1205 may not be sensitive to the level changes introduced by an activating ONU. In some embodiments, the decision threshold may be moved closer to the upper or lower edge of the eye, such as the second decision points 1210, which may better detect the small changes. In some embodiments, due to the additional robustness of the low latency transmission link in the activation window, which may be introduced by the spreading code, it may be possible accept the channel quality degradation which the shift of decision threshold may introduce for the low latency link.

In some embodiments, upstream transmissions from a synchronized ONU may include a first amount of attenuation and upstream transmissions from an activating ONU may include a second amount of attenuation. In a first case, the first attenuation may be less than the second attenuation. Alternatively, in a second case, the first attenuation may be greater than the second attenuation.

In the first case (e.g., the first attenuation associated with the synchronized ONU less than the second attenuation associated with the activating ONU), a low latency upstream transmission from a synchronized ONU may include a low attenuation such that an OLT receiver, such as the hard decision receiver 500, may be configured to receive the low latency upstream transmission and decode the low latency upstream transmission. Alternatively, or additionally, a non-low latency upstream transmission from an activating ONU may include a high attenuation such that the OLT receiver may not receive the non-low latency upstream transmission and/or the OLT receiver may have trouble or may be unable to decode the non-low latency upstream transmission.

In some embodiments including the first case, a transmit power associated ONU upstream transmission may be modulated. For example, a transmit power associated with the synchronized ONU upstream transmission may be reduced such that the OLT receiver may be configured to receive and/or decode upstream transmissions from both a synchronized ONU and an activating ONU. Alternatively, or additionally, the length of the spreading codes that may be used with upstream transmissions from the synchronized ONU and the activating ONU may be adjusted. Adjustments to the spreading codes may improve detection of the high attenuation non-low latency upstream transmission by the OLT receiver. For example, an increase in the number of elements in the spreading code may improve the likelihood that the OLT receiver may obtain the high attenuation non-low latency upstream transmission as the number of repeated bits in the upstream transmission may be increased in conjunction with the increased number of spreading code elements.

In the second case (e.g., the first attenuation associated with the synchronized ONU greater than the second attenuation associated with the activating ONU), the reception of a high attenuation, low latency upstream transmission from a synchronized ONU by the OLT receiver may experience corrupted data and/or lost or degraded data in view of a low attenuation, non-low latency upstream transmission from an activating ONU. For example, the activating ONU may include a physically shorter communication length to the OLT than the synchronized ONU such that upstream transmissions from the synchronized ONU may experience a greater attenuation than upstream transmissions from the activating ONU.

In some embodiments, the activating ONU may be configured to determine an attenuation level in transmissions between the activating ONU and the OLT. For example, the activating ONU may determine the attenuation level based on a received downstream transmission from the OLT.

In some embodiments, the activating ONU may be configured to reduce a transmission power associated with an upstream transmission. For example, in instances in which the activating ONU determines an attenuation level is greater than a threshold amount, the activating ONU may decrease the transmission power of subsequent upstream transmissions to the OLT, which may reduce interruptions of upstream transmissions from a synchronized ONU. Alternatively, or additionally, the activating ONU may be configured to increase a transmission power associated with an upstream transmission. For example, in instances in which the activating ONU fails to activate in the PON, the activating ONU may increase the transmission power associated with the upstream transmission a first amount and retry activation in the PON. In instances in which the activating ONU fails to activate in the PON following increasing the transmission power the first amount, the activating ONU may increase the transmission power associated with the upstream transmission a second amount and retry activation in the PON, and so forth.

In these and other embodiments, the hard decision receiver 500 may be tuned to receive upstream transmissions, which may include upstream transmissions including a transmitted power below a threshold. For example, in instances in which an activating ONU transmits an upstream transmission that includes a power level below a threshold, the hard decision receiver 500 may be configured to adjust on or more receiver settings which may improve the likelihood of receiving future upstream transmissions from the activating ONU.

In some embodiments, an OLT receiver that includes a hard decision receiver 500, may include more than one limiting amplifier 515, such that more than one threshold may be implemented in the hard decision receiver 500. In some embodiments, a two threshold OLT receiver may be configured to distinguish a synchronized ONU's high attenuation, low latency upstream transmission from an activating ONU's low attenuation, non-low latency upstream transmission. In some embodiments, the two threshold OLT receiver may be configured to receive more than one bit of information per received symbol in an upstream transmission. For example, a first bit of a received symbol at the OLT receiver may be associated with an upstream transmission from an activating ONU, and a second bit of a received symbol at the OLT receiver may be associated with an upstream transmission from a synchronized ONU. See FIG. 6 for an example of how a two threshold OLT receiver may receive overlayed upstream transmissions. In some embodiments, the high attenuation upstream transmission may be overlayed with the low attenuation upstream transmission, and the two threshold OLT receiver may be configured to receive both the high attenuation upstream transmission and the low attenuation upstream transmission.

Modifications, additions, or omissions may be made to the hard decision receiver 500 without departing from the scope of the present disclosure. For example, the hard decision receiver 500 may include a second limiting amplifier. In some embodiments, the output of the second limiting amplifier may be combined with the output from the limiting amplifier 515 for input into the clock data recovery 520. In some embodiments, the combination may include a sum of the output of the second limiting amplifier and the output from the limiting amplifier 515.

Alternative, or additional modifications, additions, or omissions may be made to the hard decision receiver 500 without departing from the scope of the present disclosure. For example, in some embodiments, the hard decision receiver 500 may include any number of other components that may not be explicitly illustrated or described.

Figure 6:
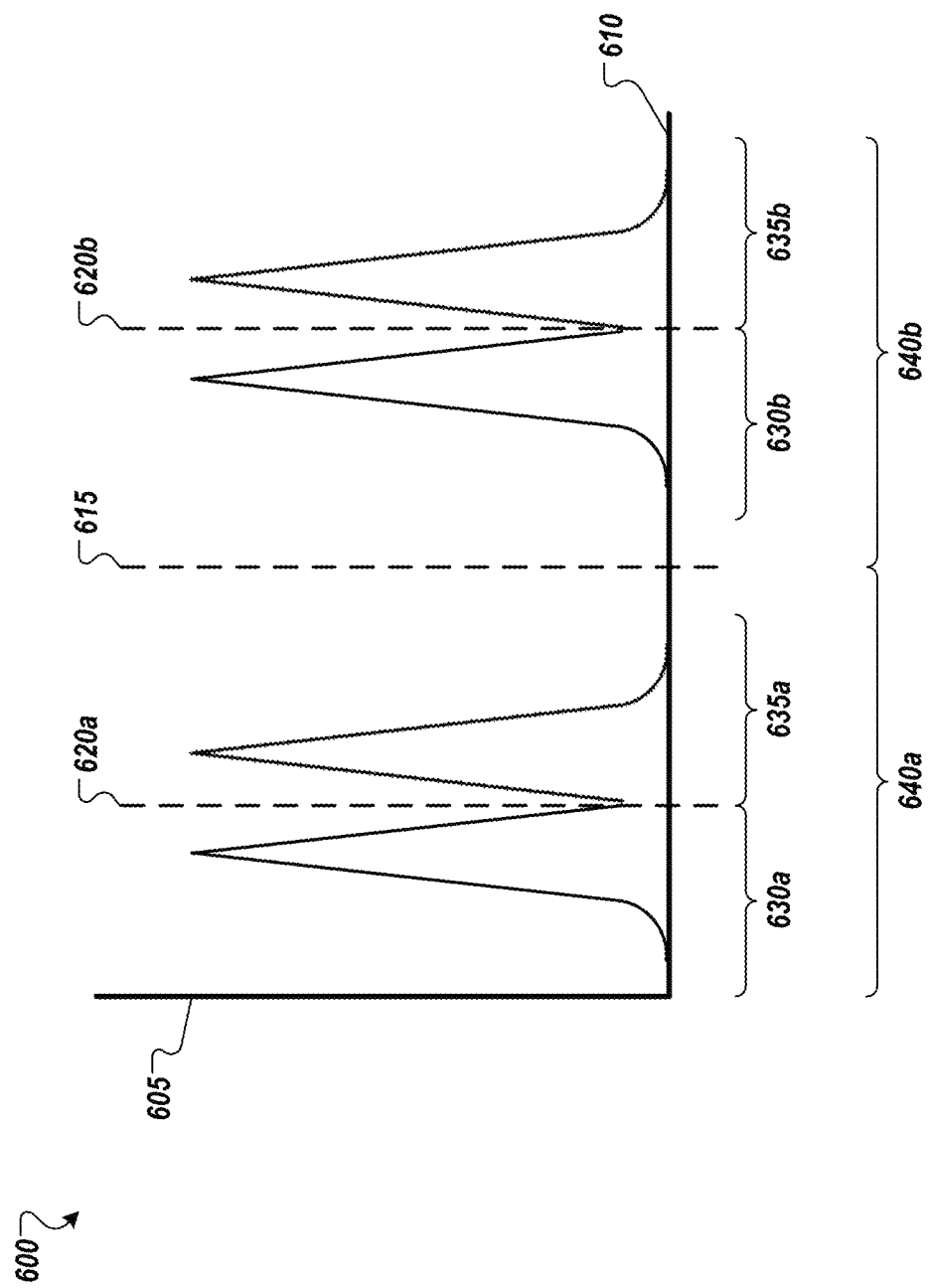
FIG. 6 illustrates an example probability density graph for receiving upstream transmissions in a passive optical network.

FIG. 6 illustrates an example probability density graph 600 for receiving upstream transmissions in a passive optical network, in accordance with at least one embodiment described in the present disclosure. The probability density graph 600 may include a probability axis 605, an amplitude axis 610, a low attenuation threshold 615, a first high attenuation threshold 620a, a second high attenuation threshold 620b, referred to collectively as high attenuation threshold 620, a first high attenuation signal range 630a, a second high attenuation signal range 635a, a third high attenuation signal range 630b, a fourth high attenuation signal range 635b, a first low attenuation signal range 640a, and a second low attenuation signal range 640b.

In some embodiments, the probability density graph 600 may illustrate probability densities of received upstream transmissions by an OLT receiver, such as the hard decision receiver 500 of FIG. 5. In some embodiments, the hard decision OLT receiver may include more than one limiting amplifier which may cause multiple thresholds in determining symbols from an upstream transmission.

In some embodiments, the low attenuation threshold 615 may be configured to separate the first low attenuation signal range 640a and the second low attenuation signal range 640b. For example, a signal included in the first low attenuation signal range 640a of the probability density graph 600 may be associated with a first symbol of a low attenuation upstream transmission. Alternatively, or additionally, a signal included in the second low attenuation signal range 640b may be associated with a second symbol of the low attenuation upstream transmission. In these and other embodiments, the first low attenuation signal range 640a and the second low attenuation signal range 640b may be associated with the low attenuation up stream transmission.

In some embodiments, the first high attenuation threshold 620a and the second high attenuation threshold 620b may be configured to separate the first high attenuation signal range 630a from the second high attenuation signal range 635a, and the third high attenuation signal range 630b from the fourth high attenuation signal range 635b, respectively. In some embodiments, the first high attenuation signal range 630a and the second high attenuation signal range 635a may be associated with the first low attenuation signal range 640a. For example, an upstream transmission in the first high attenuation signal range 630a may indicate a first high attenuation symbol associated with the first high attenuation signal range 630a and may also indicate a first low attenuation symbol associated with the first low attenuation signal range 640a.

Alternatively, or additionally, the 635a and the 635b may the third high attenuation signal range 630b and the fourth high attenuation signal range 635b may be associated with the second low attenuation signal range 640b. For example, an upstream transmission in the third high attenuation signal range 630b may indicate a first high attenuation symbol associated with the third high attenuation signal range 630b and may also indicate a second low attenuation symbol associated with the second low attenuation signal range 640b.

Modifications, additions, or omissions may be made to the probability density graph 600 without departing from the scope of the present disclosure. For example, in some embodiments, the probability density graph 600 may include any number of other components that may not be explicitly illustrated or described.

Figure 7A:
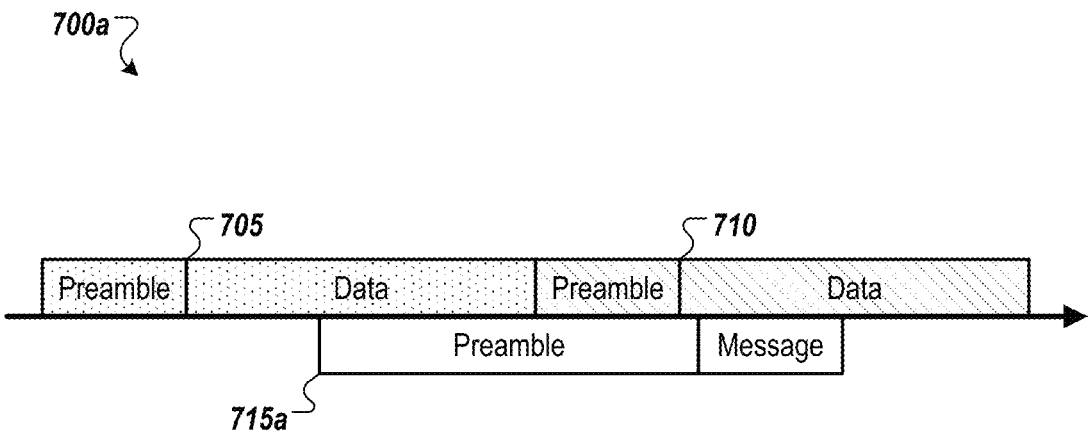
FIGS. 7A and 7B illustrate example transmissions during an activation window in a passive optical network.
Figure 7B:
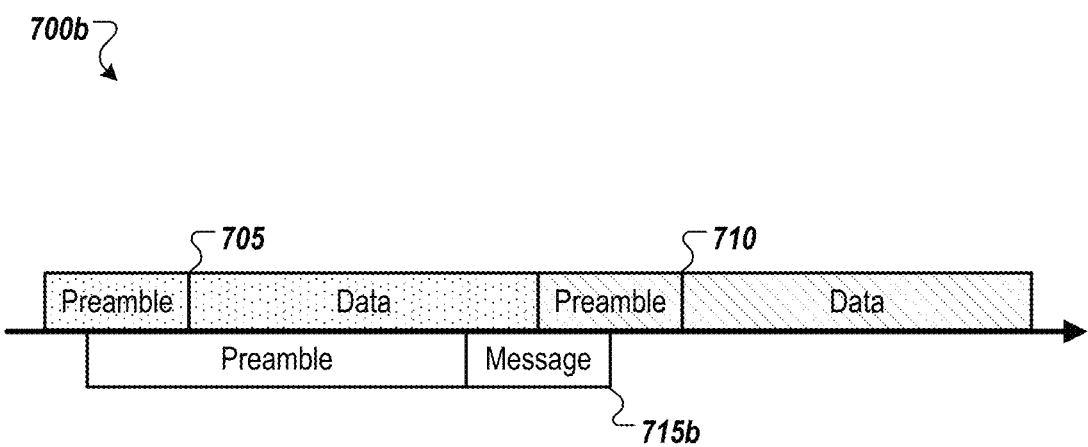

FIGS. 7A and 7B illustrate an example first transmission 700a and an example second transmission 700b during an activation window in a passive optical network, in accordance with at least one embodiment described in the present disclosure. The first transmission 700a may include a first upstream transmission 705, a second upstream transmission 710, and a first activating upstream transmission 715a. The second transmission 700b may include the first upstream transmission 705, the second upstream transmission 710, and a second activating upstream transmission 715b.

In some embodiments, the first upstream transmission 705 and the second upstream transmission 710 may include upstream transmissions from one or more synchronized ONUs to an OLT in a PON. In some embodiments, the first activating upstream transmission 715a may include an upstream transmission from an activating ONU at a first time, such as a first portion of an activating window. In some embodiments, the second activating upstream transmission 715b may include an upstream transmission from an activating ONU at a second time, such as a second portion of an activating window.

In some embodiments, upstream transmissions may be organized in bursts, such as the first upstream transmission 705 and a second upstream transmission 710. In some embodiments, spreading code may be multiplexed with the upstream transmissions, such as during an activating window. In some embodiments, the spreading code may be multiplexed with the preamble and/or the data of the upstream transmission. In some embodiments, the preamble may be used to synchronize the bit timing of the upstream transmission with the OLT. Alternatively, or additionally, the preamble may be used to adjust adaptive elements of the OLT receiver, such as an analog gain control and/or a decision threshold. In these and other embodiments, the OLT may define the content that may be included in the preamble.

In some embodiments, a transmission of an activating upstream transmission, such as the first activating upstream transmission 715a, may cause a temporary increase of the bit error rate associated with a synchronized upstream transmission, such as the first upstream transmission 705. For example, in instances in which an activating upstream transmission begins during a synchronized upstream transmission, adaptive elements of the OLT receiver may adjust to be configured to receive the activating upstream transmission, which may cause a temporary increase of the bit error rate associated with the synchronized upstream transmission.

As illustrated in FIG. 7A, in some embodiments, the first activating upstream transmission 715a may occur during a data portion of the first upstream transmission 705. In some embodiments, the first upstream transmission 705 may include forward error correction (FEC) coding, as described herein, which may reduce and/or prevent the loss of data from the first upstream transmission 705. Alternatively, or additionally, the first upstream transmission 705 may implement interleaving between the FEC codewords which may reduce and/or prevent a temporary increase of the coded error rate during the transmission of the first activating upstream transmission 715a.

In some embodiments, the first activating upstream transmission 715a may be ongoing during the beginning of the transmission of the second upstream transmission 710. In some embodiments, the OLT receiver may be configured to adjust the adaptive elements of the OLT receiver after the first activating upstream transmission 715a, which may introduce a temporary increase of the bit error rate associated with the second upstream transmission 710. In some embodiments, the OLT receiver may be configured to implement FEC coding and/or interleaving which may reduce and/or prevent the temporary increase of the coded error rate from the second upstream transmission 710.

As illustrated in FIG. 7B, in some embodiments, the second activating upstream transmission 715b may occur during a preamble portion of the first upstream transmission 705. In some embodiments, the overlap of the second activating upstream transmission 715b and the first upstream transmission 705 may cause little or no effect on the data of the first upstream transmission 705. For example, the OLT receiver may be configured to adjust the adaptive elements during the preamble of the first upstream transmission 705 and the preamble of the second activating upstream transmission 715b, such that the data of the first upstream transmission 705 and the data of the second activating upstream transmission 715b may not experience the temporary increase of the coded error rate.

In some embodiments, the second activating upstream transmission 715b may be ongoing during the beginning of the transmission of the second upstream transmission 710, such as during the preamble portion of the second upstream transmission 710. In some embodiments, the spreading code multiplexed with the second activating upstream transmission 715b and/or the FEC coding associated with the second activating upstream transmission 715b may enable the OLT receiver to continue to receive the data from the second activating upstream transmission 715b.

Modifications, additions, or omissions may be made to the first transmission 700a and/or the second transmission 700b without departing from the scope of the present disclosure. For example, in some embodiments, the first transmission 700a and/or the second transmission 700b may include any number of other components that may not be explicitly illustrated or described.

Figure 8:
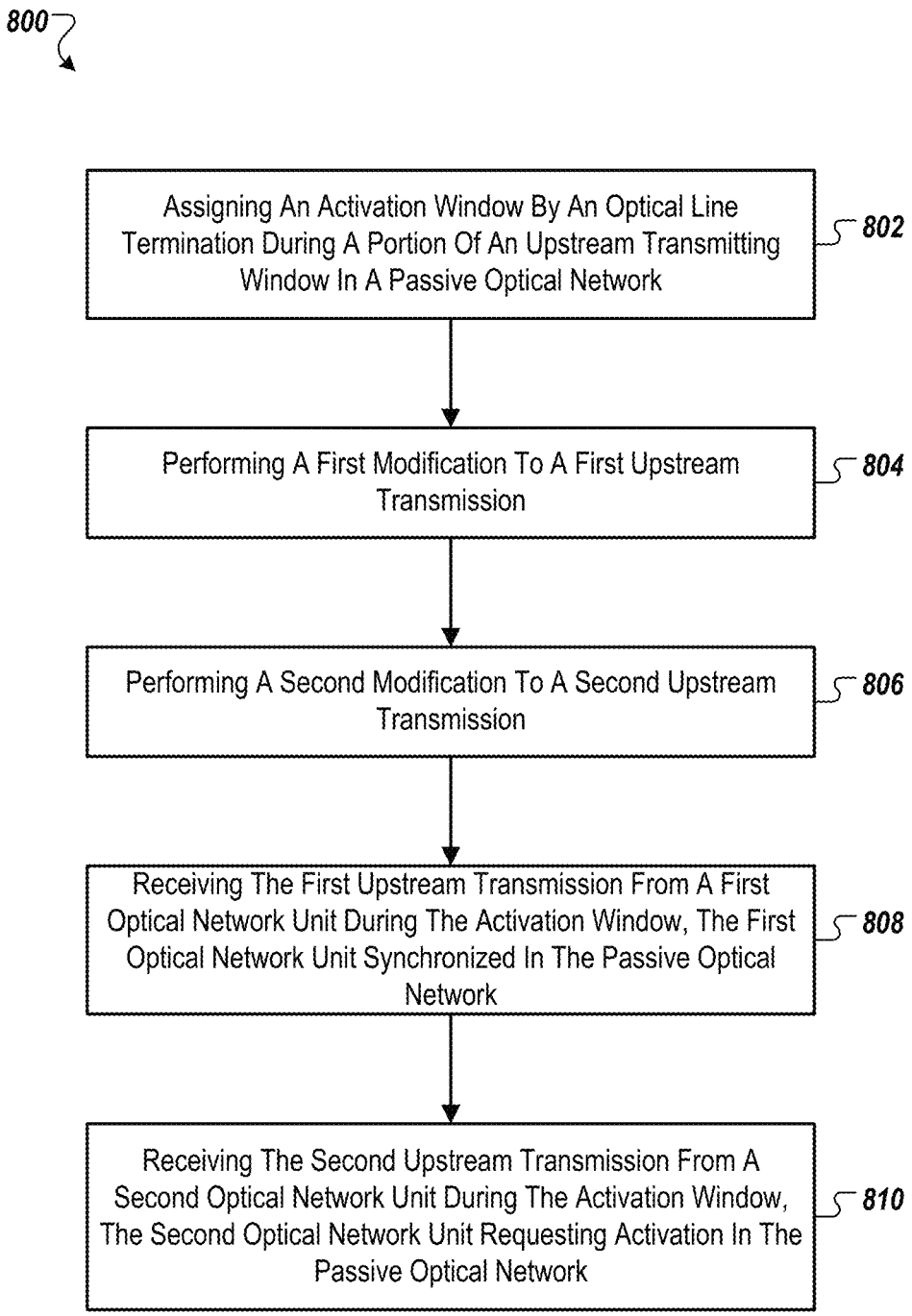
FIG. 8 illustrates an example method of optical network unit activation and low latency transmissions in delay sensitive networks.

FIG. 8 illustrates an example method 800 of optical network unit activation and low latency transmissions in delay sensitive networks, in accordance with at least one embodiment described in the present disclosure. The method 800 may be arranged in accordance with at least one embodiment described in the present disclosure.

Figure 9:
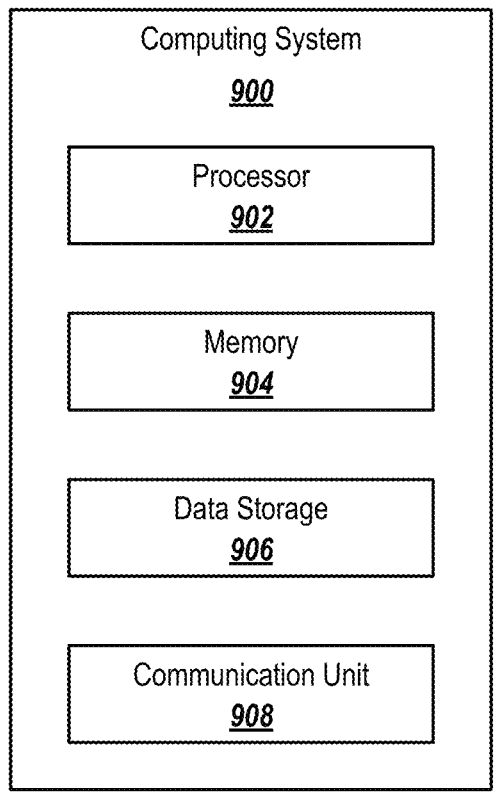
FIG. 9 illustrates an example computing system that may be used for optical network unit activation and low latency transmissions in delay sensitive networks.

The method 800 may be performed by processing logic that may include hardware (circuitry, dedicated logic, etc.), software (such as is run on a computer system or a dedicated machine), or a combination of both, which processing logic may be included in the OLT 105 of FIG. 1, the computing system 900 of FIG. 9, or another device, combination of devices, or systems.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 800 may begin at block 802 where the processing logic may assign an activation window by an optical line terminal (OLT) during a portion of an upstream transmitting window in a passive optical network (PON).

At block 804, the processing logic may perform a first modification to a first upstream transmission. In some embodiments, the first modification may include a first spreading code, and the second modification may include a second spreading code. In some embodiments, the first spreading code may include a first length Alternatively, or additionally, the second spreading code may include a second length that is different from the first length.

In some embodiments, the first upstream transmission may include a low latency, high priority transmission. In some embodiments, first data of the first upstream transmission may be forward error correction (FEC) coded using a first code setting. Alternatively, or additionally, second data of the second upstream transmission may be FEC coded using a second code setting.

In some embodiments, the first spreading code may include at least one of an orthogonal sequence or a pseudo-random sequence. Alternatively, or additionally, the second spreading code may include at least one of an orthogonal sequence or a pseudorandom sequence. Alternatively, or additionally, the first spreading code may include an orthogonal sequence, and the second spreading code may include a pseudorandom sequence.

At block 806, the processing logic may perform a second modification to a second upstream transmission.

At block 808, the processing logic may receive the first upstream transmission from a first optical network unit (ONU) during the activation window, the first ONU synchronized in the PON.

At block 810, the processing logic may receive a second upstream transmission from a second ONU during the activation window, the second ONU requesting activation in the PON.

Modifications, additions, or omissions may be made to the method 800 without departing from the scope of the present disclosure. For example, in some embodiments, the first modification may include a first transmit power modulation. Alternatively, or additionally, the second modification may include a second transmit power modulation.

In some embodiments, the OLT may receive the first upstream transmission and the second upstream transmission by a soft decision receiver. Alternatively, or additionally, the OLT may receive the first upstream transmission and the second upstream transmission by a hard decision receiver.

In some embodiments, the processing logic may restrict a third upstream transmission from a third ONU during the activation window. The third upstream transmission may include a non-low latency transmission.

In some embodiments, the processing logic may assign an open contention grant by the OLT such that the first ONU, the second ONU, and a third ONU may transmit without an explicit grant from the OLT. The processing logic may receive a third upstream transmission from the third ONU that may collide with the second upstream transmission from the second ONU. In some embodiments, the third upstream transmission may include a first spreading code and the second upstream transmission including a second spreading code. In some embodiments, the processing logic may activate the second ONU in the PON. In some embodiments, the processing logic may activate the third ONU in the PON.

In some embodiments, the second ONU may randomly select the first spreading code. Alternatively, or additionally, the third ONU may randomly select the second spreading code.

FIG. 9 illustrates an example computing system 900 that may be used for optical network unit activation and low latency transmissions in delay sensitive networks, in accordance with at least one embodiment described in the present disclosure. The computing system 900 may be configured to implement or direct one or more operations associated with optical network unit activation and low latency transmissions in delay sensitive networks, which may include the OLT 105, the first ONU 115, the second ONU 120, and/or the nth ONU 125 of FIG. 1. The computing system 900 may include a processor 902, memory 904, data storage 906, and a communication unit 908, which all may be communicatively coupled. In some embodiments, the computing system 900 may be part of any of the systems or devices described in this disclosure.

For example, the computing system 900 may be part of the OLT 105, the first ONU 115, the second ONU 120, and/or the nth ONU 125 of FIG. 1 and may be configured to perform one or more of the tasks described above with respect to the OLT 105, the first ONU 115, the second ONU 120, and/or the nth ONU 125, respectively.

The processor 902 may include any computing entity, or processing device including various computer hardware or software modules and may be configured to execute instructions stored on any applicable computer-readable storage media. For example, the processor 902 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 9, it is understood that the processor 902 may include any number of processors distributed across any number of networks or physical locations that are configured to perform individually or collectively any number of operations described herein.

In some embodiments, the processor 902 may be configured to interpret and/or execute program instructions and/or process data stored in the memory 904, the data storage 906, or the memory 904 and the data storage 906. In some embodiments, the processor 902 may fetch program instructions from the data storage 906 and load the program instructions in the memory 904. After the program instructions are loaded into memory 904, the processor 902 may execute the program instructions.

For example, in some embodiments, the processor 902 may be configured to interpret and/or execute program instructions and/or process data stored in the memory 904, the data storage 906, or the memory 904 and the data storage 906. The program instruction and/or data may be related to optical network unit activation and low latency transmissions in delay sensitive networks such that the computing system 900 may perform or direct the performance of the operations associated therewith as directed by the instructions. In these and other embodiments, the instructions may be used to perform the method 800 of FIG. 8.

The memory 904 and the data storage 906 may include computer-readable storage media or one or more computer-readable storage mediums for carrying or having computer-executable instructions or data structures stored thereon. Such computer-readable storage media may be any available media that may be accessed by a computer, such as the processor 902.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 902 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 908 may include any component, device, system, or combination thereof that is configured to transmit or receive information over a network. In some embodiments, the communication unit 908 may communicate with other devices at other locations, the same location, or even other components within the same system. For example, the communication unit 908 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMax device, cellular communication facilities, etc.), and/or or the like. The communication unit 908 may permit data to be exchanged with a network and/or any other devices or systems described in the present disclosure. For example, when the computing system 900 is included in the OLT 105 of FIG. 1, the communication unit 908 may allow the OLT 105 to communicate with the first ONU 115, the second ONU 120, and/or the nth ONU 125 of FIG. 1.

Modifications, additions, or omissions may be made to the computing system 900 without departing from the scope of the present disclosure. For example, in some embodiments, the computing system 900 may include any number of other components that may not be explicitly illustrated or described. Further, depending on certain implementations, the computing system 900 may not include one or more of the components illustrated and described.

As indicated above, the embodiments described herein may include the use of a computing system (e.g., the processor 902 of FIG. 9) including various computer hardware or software modules. Further, as indicated above, embodiments described herein may be implemented using computer-readable media (e.g., the memory 904 of FIG. 9) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
    assigning an activation window by an optical line terminal (OLT) during a portion of an upstream transmitting window in a passive optical network (PON);
    assigning an open contention grant such that one or more optical network units (ONUs) may transmit without an explicit grant from the OLT;
    performing a first modification to a first upstream transmission;
    performing a second modification to a second upstream transmission;
    receiving the first upstream transmission from a first ONU during the activation window, the first ONU synchronized in the PON;
    receiving the second upstream transmission from a second ONU during the activation window, the second ONU requesting activation in the PON;
    receiving a third upstream transmission from a third ONU that collides with the second upstream transmission from the second ONU;
    activating the second ONU in the PON; and
    activating the third ONU in the PON.

2. The method of claim 1, wherein the first modification comprises a first spreading code and the second modification comprises a second spreading code.

3. The method of claim 2, wherein the first spreading code includes a first length, and the second spreading code includes a second length that is different from the first length.

4. The method of claim 2, wherein the first spreading code includes at least one of an orthogonal sequence or a pseudorandom sequence and the second spreading code includes at least one of the orthogonal sequence or the pseudorandom sequence.

5. The method of claim 2, wherein the first spreading code is an orthogonal sequence, and the second spreading code is a pseudorandom sequence.

6. The method of claim 2, wherein the first modification further comprises a first transmit power modulation, and the second modification further comprises a second transmit power modulation.

7. The method of claim 1, further comprising the OLT receiving the first upstream transmission and the second upstream transmission by a soft decision receiver.

8. The method of claim 1, further comprising the OLT receiving the first upstream transmission and the second upstream transmission by a hard decision receiver.

9. The method of claim 1, wherein the first upstream transmission comprises a low latency, high priority transmission.

10. The method of claim 1, wherein a first data of the first upstream transmission is forward error correction (FEC) coded using a first code setting, and a second data of the second upstream transmission is FEC coded using a second code setting.

11. The method of claim 1, further comprising restricting the third upstream transmission from the third ONU during the activation window, the third upstream transmission including a non-low latency transmission.

12. The method of claim 1, wherein the second ONU randomly selects the first spreading code and the third ONU randomly selects the second spreading code.

* * * * *